UNITED STATES PATENT OFFICE.

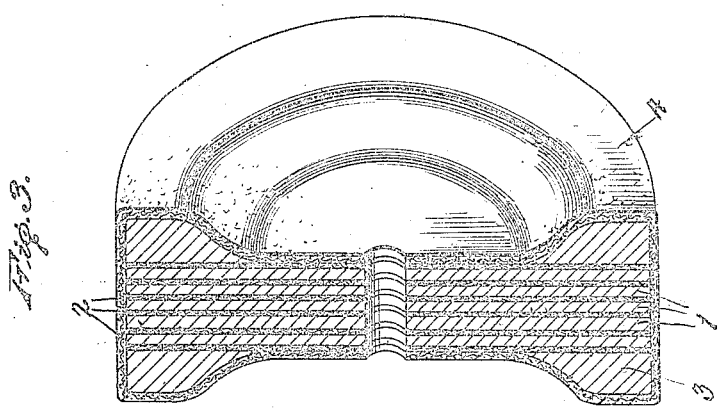
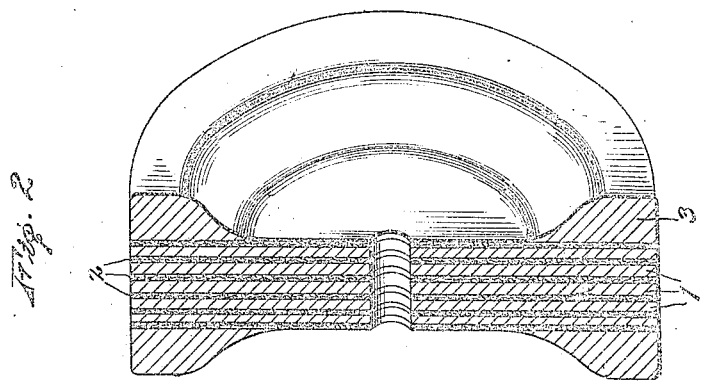
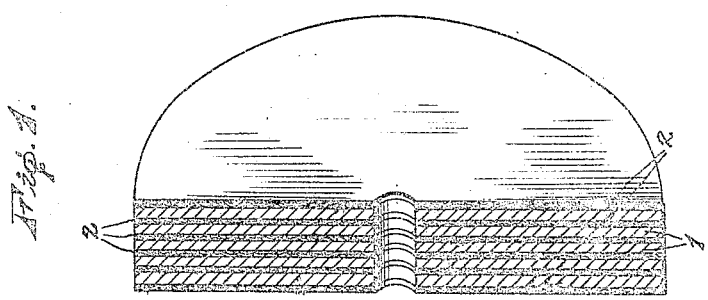

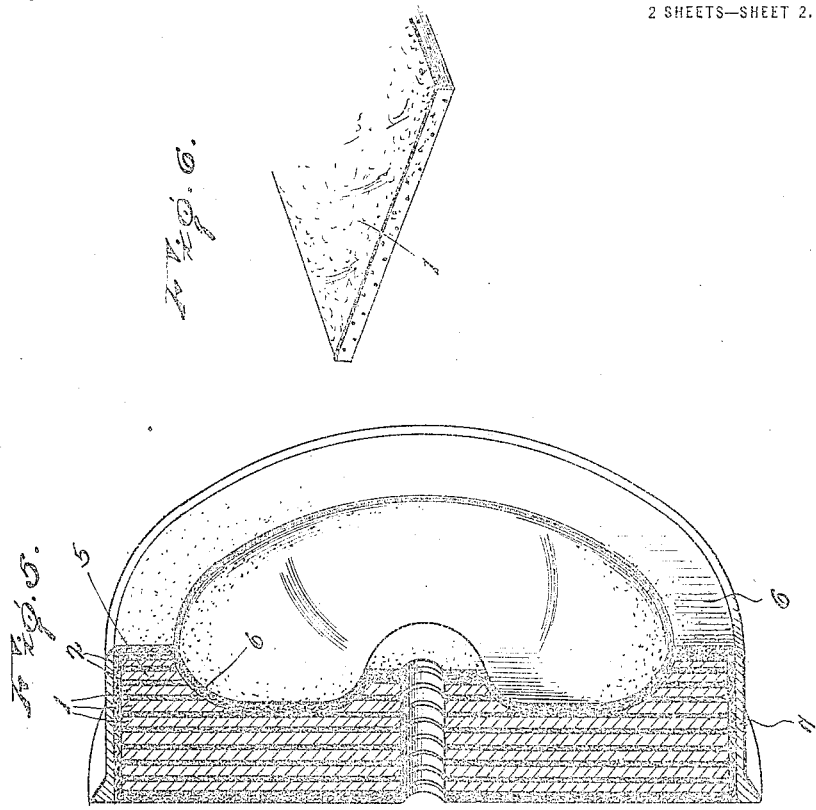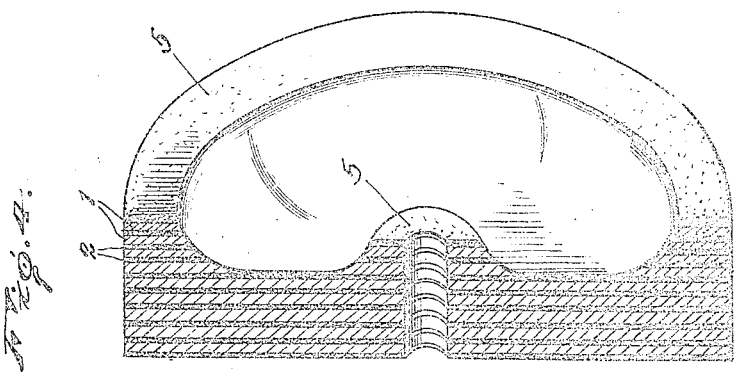

HARRY N. ATWOOD AND GEORGE B. BAINS, 2d, OF READING, PENNSYLVANIA.

LAMINATED COMPOSITE WHEEL.

1,422,813.

Specification of Letters Patent. Patented July 18, 1922.

Application filed December 24, 1920, Serial No. 432,932. Renewed November 16, 1921. Serial No. 515,895.

*To all whom it may concern:*

Be it known that we, HARRY N. ATWOOD and GEORGE B. BAINS, 2d, citizens of the United States, residing at Reading, in the county of Berks and State of Pennsylvania, have invented certain new and useful Improvements in Laminated Composite Wheels, of which the following is a specification.

This invention relates to an improved wheel construction and a novel method of producing the same.

In our co-pending application filed December 24, 1920, Serial No. 432,927, we have disclosed a novel composite laminated structure produced by the method disclosed in our co-pending application filed December 24, 1920, Serial No. 432,926, and in the first said co-pending application we have described the use of this laminated structure in the manufacture of vehicle wheels the body of the wheel having relatively straight sides and comprising a circular slab of the laminated structure produced in accordance with the two first-mentioned applications. However, it will frequently be desired to manufacture a wheel having one or both of its sides of complex curved form, and therefore the primary object of the present invention is to produce such a wheel and to evolve a novel method whereby the same may be built up.

One of the chief advantages of a wheel constructed in accordance with the general principles involved in the several applications is that it is proof against the deteriorating effects of atmospheric and sensible moisture by reason of the fact that one of the laminæ of the structure of which the wheel is composed extends over the surface of the wheel body and is of moisture-resisting material, and another object of the invention is to disclose a way in which one or both sides of the wheel may be built up to any desired curvilinear form regardless of the complexity of the exhibited curves, and in which the lamina or laminæ above specifically referred to may be applied so as to conform to the contour of the said side or sides of the wheel, and at this point it may be noted that while the present invention discloses the principles which will hereinafter be set forth as employed in producing a wheel structure, the invention is not limited to this specific application of such principles but may be followed in producing various other structures the contour of which will exhibit complex curves.

In the accompanying drawings:

Figure 1 is a sectional perspective view illustrating a portion of a wheel body as produced by the preliminary step in the method;

Figure 2 is a similar view illustrating the next step to be followed;

Figure 3 is a similar view illustrating the completed wheel body;

Figure 4 is a view similar to Figure 1 illustrating another manner in which the invention may be carried out in the preliminary step of the method;

Figure 5 is a similar view illustrating the substantially completed wheel produced as a result of the carrying out of the other steps of the method;

Figure 6 is a fragmentary perspective view illustrating a portion of one of the plies of the laminated structure.

The laminated structure referred to above as forming the subject matter of our co-pending application filed Dec. 24, 1920, Serial No. 432,927, comprises plies 1 which are of wood and may for example be in the form of veneer or in the form of wood slabs, and other plies 2 which serve as bonding plies and which are alternated with the plies 1. In producing this structure the plies 1 are impregnated with a suitable rubber solvent, and the plies 2 are produced by embedding a sheet of foraminous material, such for example as wire mesh in rubber or a composition of rubber and other materials. The prepared plies, after assemblage, are subjected to heat and pressure and as a result of such treatment the rubber content of the plies 2 is vulcanized and a portion thereof is carried by the impregnating solvent of the plies 1 into the pores of the said plies 1 so that an intimate union between the parts is effected. After producing a blank in the manner recited, the same is cut to circular form as disclosed in Figure 1 of the drawings.

Assuming that it is desired to give to one or both sides of the wheel body a curvilinear form exhibiting complex curves, a quantity of some initially plastic material 3, such for example as rubber vulcanizable to a substantially hard state, is applied to either or both faces of the blank structure shown in Figure 1 of the drawings and roughly molded to the form generally desired.

Following the step above described, one or more sheets 4 preferably of the same material as that comprising the plies 2, are prepared and applied over the surfaces of the partly formed wheel body shown in Figure 2, and in the manner illustrated in Figure 3, this sheet or the two or more sheets employed extending over the said faces of the incomplete wheel body and over the molded portions 3 and also over a greater or less width of the periphery of the structure shown in Figure 1. The next step in the method consists in placing the assemblage shown in Figure 3 in a suitable mold and subjecting the same to heat and pressure, and in this step the mass of material 3 will be vulcanized to the required degree of hardness and pressed to the true curvilinear form desired. At the same time the covering sheets or plies 4 will be vulcanized to the exposed surfaces of the structure shown in Figure 1 as well as to the molded mass 3. To the completed wheel body thus produced may then be applied any desired rim structure, and any other parts or structures which it may be desired to employ in connection with the wheel.

It will be understood that as a result of the method above pointed out, a wheel may be produced which has smooth exposed surfaces of curvilinear contour exhibiting any desired complex curves, for in the molding operation and by the use of properly formed mold members, the mass of plastic material 3 will be molded precisely to the form defined by the mold parts, and the covering sheets or plies 4 will be caused to closely conform to the molded contour.

In the form of the invention shown in Figures 4 and 5 of the drawings, the wheel body is built up in substantially the manner shown in Figure 1 of the drawings but the desired curvilinear contour of either or both sides of the body is produced by working the initially produced blank to the required form or by adding to a structure such as that shown in Figure 1 of the drawings other plies variously shaped and proportioned to produce, for example, a bulged portion 5 at one side or both sides of the wheel. Thus in the embodiment illustrated one of such bulged portions may be located at the periphery of the face of the wheel and another such bulged portion may be located at the center of the wheel and thus define the hub. Thus in this embodiment additional plies 1 and 2 are added to the flat-sided structure originally produced, or the originally produced flat-sided structure of a predetermined thickness is worked to the required contour, the supplemental plies forming the bulged portions 5 taking the place of the plastic vulcanizable material 3 employed in the first described embodiment of the invention.

Having produced what is shown in Figure 4 of the drawings, one or more sheets 6 of material corresponding in structure to the bonding plies 2 and illustrated in detail in Figure 6, are applied over the surface of the said structure shown in Figure 4 in the manner illustrated in Figure 5 and as previously described in the step illustrated in Figure 3, and the entire assemblage is then subjected to heat and pressure in a suitable mold as previously pointed out, thus uniting all of the parts by a process of vulcanization and causing the sheets thus to conform closely and smoothly to the contour of the surfaces of the structure shown in Figure 4. To this wheel body thus produced there may be added any desired rim such for example as the rim shown in Figure 5 and indicated by the numeral 7, and any desired hub parts.

Having thus described the invention, what is claimed as new is:

1. The method of producing a composite laminated structure of complex contour which comprises providing a flat body surface with an outstanding portion substantially defining the contour desired, applying to the built-up surface, a ply of vulcanizable material, and subjecting the assemblage to a molding operation attended by heat and pressure whereby to effect union of the ply to the built-up surface and cause the same to conform to the contour of the said surface.

2. The method of producing a composite laminated structure of complex contour which comprises providing a flat body surface with an outstanding portion of a material capable of being molded and which portion defines substantially the contour desired, applying to the built-up surface a ply of vulcanizable material, and subjecting the assemblage to a molding operation attended by heat and pressure whereby to mold the said outstanding portion and whereby to effect union of the ply to the built-up surface and cause the ply to conform to the contour of the said surface.

3. The method of producing a composite laminated structure of complex contour which comprises assembling alternate plies of fibrous material and of bonding material applying to the surface of one of the outer plies a mass of material capable of being molded and shaping the mass to define substantially the contour desired, applying to the built-up surface a ply of the bonding material, and subjecting the assemblage to a molding operation attended by heat and pressure whereby to effect a union of all of the component parts and whereby to cause the last-mentioned ply to conform to the contour of the said surface.

4. The method of producing a composite laminated structure of complex contour which comprises providing a flat body surface with an outstanding portion of a material capable of being molded, shaping the material to substantially define the contour desired, applying to the built-up surface a ply of rubber having embedded therein a foraminous sheet, and subjecting the assemblage to a molding operation attended by heat and pressure whereby to effect union of the said ply to the built-up surface and to cause the same to conform to the contour of the said surface, and also whereby to definitely mold the said outstanding portion.

5. A composite laminated structure comprising a laminated body provded upon one face with an outstanding portion defining a non-flat contour, and a ply of material vulcanized to the said face and conforming to the contour thereof.

6. A composite laminated structure comprising a laminated body provided upon one face with an outstanding portion defining a non-flat contour, and a ply of rubber material united to the said face and conforming to the contour thereof.

7. A composite laminated structure comprising a laminated body provided upon one face with an outstanding portion defining a non-flat contour, and a ply of rubber having a sheet of foraminous material embedded therein vulcanized to the said face and conforming to the contour thereof.

8. A wheel body having a body portion comprising a plurality of alternate plies of fibrous material and bonding material, an outstanding contour-defining portion molded upon one face of the body, and a ply of material extending over the said face and conforming to the contour thereof.

9. A wheel body having a body portion comprising a plurality of alternate plies of fibrous material and bonding material, an outstanding contour-defining portion molded upon one face of the body, and a ply of the said bonding material vulcanized to the said face and conforming to the contour thereof.

10. A wheel body having a body portion comprising a plurality of alternate plies of fibrous material and bonding material, an outstanding contour-defining portion molded upon one face of the body, and a ply of the said bonding material vulcanized to the said face and conforming to the contour thereof, a portion of the last-mentioned ply extending over the periphery of the body.

In testimony whereof we affix our signatures.

HARRY N. ATWOOD. [L. S.]
GEORGE B. BAINS, 3D. [L. S.]